July 6, 1943.　　　K. K. FISCHER　　　2,323,320
ROTAMETER
Filed Sept. 24, 1940　　　2 Sheets-Sheet 1
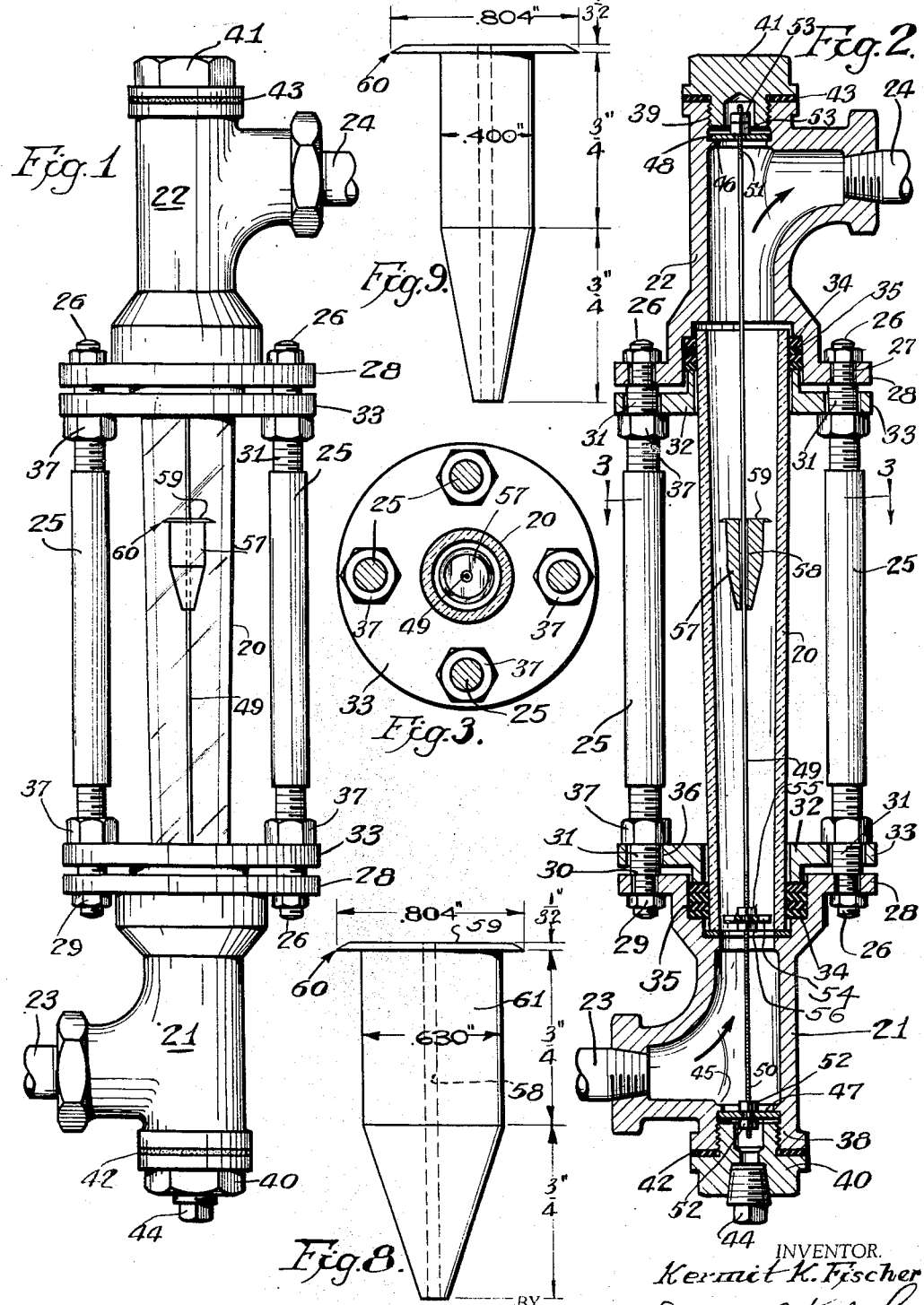
INVENTOR.
Kermit K. Fischer
BY Leonard L. Kalish
ATTORNEY.

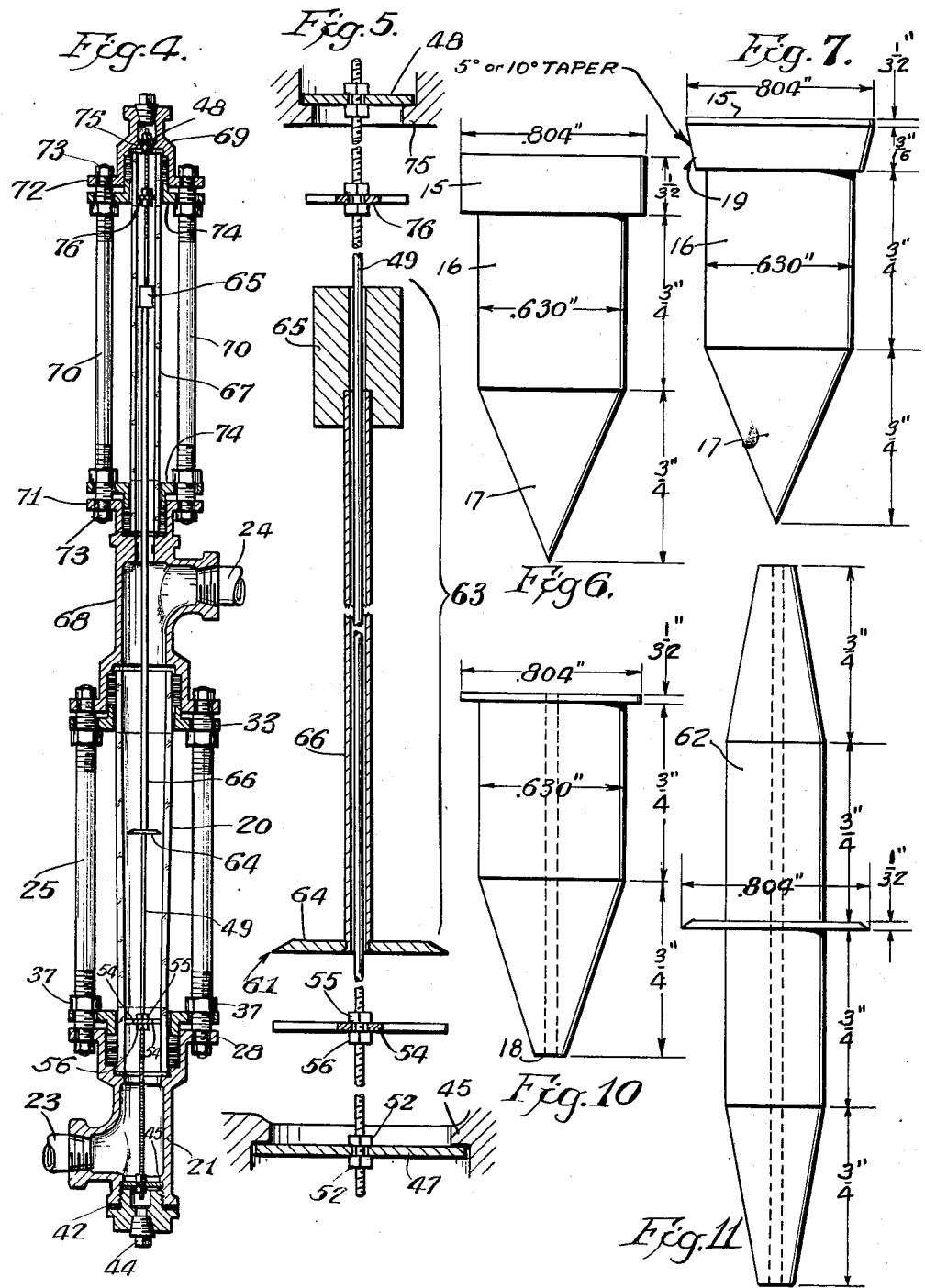

Patented July 6, 1943

2,323,320

UNITED STATES PATENT OFFICE 2,323,320

ROTAMETER

Kermit K. Fischer, Philadelphia, Pa.

Application September 24, 1940, Serial No. 358,071

6 Claims. (Cl. 73—209)

The present invention relates to variable-area type rate-of-flow meters, commonly called rotameters, and it relates more particularly to the type including a vertically disposed tapered glass tube arranged in the fluid line to be measured, with its small diameter at the bottom and with its large diameter at the top, and having a vertically movable float in the tapered glass tube, of substantially greater specific gravity than the fluid handled, adapted variably to constrict or obstruct passage through the tube, or to vary the effective cross-sectional area at a constricted zone (through which the fluid passes) according to the height of the float in the tapered tube.

While the float position in rotameters of this type fairly reflects the rate of fluid flow through the tapered tube, yet variations in the viscosity of the fluid being handled has a marked effect on the accuracy, and hence variations in viscosity require that each tapered tube be calibrated for a particular viscosity or that allowance or correction be made for variations in viscosity. This has been true of rotameters both in the larger sizes, as for instance, such as used in 3", 4" and 5" lines, as well as in the smaller sizes of the rotameters, as for instance, those used in 1" and ¾" lines. However, the effect of viscosity change of the liquid metered increases as the size of the rotameter decreases with the effect being very much greater in the smaller sizes such as the 1" or ¾" sizes. The viscosity coefficient becomes so great with certain liquids, as for instance, certain viscous oils and viscous acids, that rotameters cannot be used for metering the flow of such liquids or their use is rendered difficult. This is also true where large variations in viscosity are encountered in operation, as for instance, viscosity variations due to temperature variations or due to other factors.

One of the objects of the present invention is to provide a tapered glass tube type rotameter in which the viscosity coefficient is so greatly reduced as to permit of accuracy notwithstanding changes in viscosity of the liquid handled, and also to permit of the use of the same calibrated tapered glass tube for liquids of different viscosity.

For the purpose of illustrating the invention, there is shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of instrumentalities as herein shown and described.

In the accompanying drawings, in which like reference characters indicate like parts, Figure 1 represents a front elevational view of one embodiment of the present invention.

Figure 2 represents a vertical cross-sectional view of the same.

Figure 3 represents a cross-sectional view along the line 3—3 of Figure 2.

Figure 4 represents a vertical cross-sectional view of another modified embodiment of the present invention.

Figure 5 represents a fragmentary cross-sectional view on an enlarged scale of some of the elements of the embodiment shown in Figure 4.

Figures 6 and 7 represent front elevational views of two typical rotameter floats of the conventional type heretofore used.

Figure 8 represents a front elevational view of the float of the rotameter of the present invention as shown in Figures 1 and 2, but in an enlarged scale, namely the same scale as that to which the floats illustrated in Figures 6 and 7 are drawn.

Figure 9 represents a front elevational view of still another form of float of the rotameter of the present invention also drawn to the same scale as Figures 6, 7 and 8.

Figures 10 and 11 represent front elevational views of two further modified forms of floats of the rotameter shown in the embodiments of present invention, also drawn to the same scale as Figures 6, 7, 8 and 9.

Floats as commonly used in rotameters, up to the present time, and as shown in Figures 6 and 7, consist generally of three portions, namely the "head" part 15, which has the largest diameter and which generally determines the extent of the constriction created in the tapered glass tube; the "body" part 16 which is generally a cylindrical piece below the "head" and is either attached thereto or formed integrally therewith, and the tapered "tail" portion 17 below the "body," and also generally formed integrally therewith, which is either conical or frustro-conical with a small, flat bottom surface upon which it may be supported in its lowermost position when there is no flow. Floats of this type (of the general form shown in Figure 6 or of the general form shown in Figure 7), have had the lower part of the "head" portion slightly tapered, as at 19; this taper being from 5 to 10 degrees. The purpose of this slight taper has been to increase the capacity of the meter as it will permit of a greater flow capacity for the same size tube and float.

In the prior rotameter practice, it was necessary to have a substantially thick "head" portion 15, that is, it was necessary that the "head" should have a substantial vertical dimension in relation to the "head" diameter (as for instance of the order of ¼ to ⅓ of the "head" diameter), and it was necessary that the "body" diameter be of the order of 75% to 80% of the "head" diameter. These proportions were necessary in order to center and stabilize the float within the tapered tube and to prevent any wobbling of the float and to prevent any frictional contact between the tube and the float.

I have found that by substantially reducing the thickness or vertical dimension of the "head" portion of the float, and by centering the float in the tube by a thin tensioned guide wire passing freely through a small vertical center hole in the float, the viscosity coefficient can be substantially reduced and the float adequately centered within the tapered glass tube.

In Figures 1 and 2, I have illustrated a rotameter representing one embodiment of the present invention in which a tapered glass tube 20 is supported between the terminal fittings 21 and 22 to which the pipes 23 and 24 (forming part of the fluid line) are connected. The fittings 21 and 22 are held together in rigid and spaced relation to each other by a plurality of spacer posts or standards 25 whose reduced and threaded terminal portions 26 pass through corresponding aligned holes 27 in the similar flanges 28 of the fittings 21 and 22. Flanges 28 are held firmly in position between the nuts 29 on the reduced-diameter terminal portions 26 and the shoulders 30 intermediate the reduced-diameter terminal portions 26 and the somewhat larger threaded portions 31 of the posts 25. Similar lower and upper stuffing glands 32, having flanges 33, are provided for compressing suitable packing rings or material 34 within the stuffing box portions or recesses 35 of the fittings 21 and 22, in sealing relation to the ends of the tapered glass tube 20 and the fittings. The flanges 33 are provided with aligned apertures 36 through which the large threaded portions 31 of the posts 25 extend. The nuts 37 serve adjustably to press the stuffing glands into place.

The fittings 21 and 22 are provided with threaded axial openings 38 and 39 which are normally closed by threaded plugs 40 and 41 and intervening sealing gaskets 42 and 43. The lower plug 40 may also have a further screw plug 44 provided therein.

Within the aligned apertures 38 and 39, similar inwardly extending flanges 45 and 46 are formed, which provide annular shoulders or abutments for supporting wire anchorage plates or washers 47 and 48. The wire anchorage plates or washers 47 and 48 are centrally apertured. The thin guide wire 49 threaded at its lower and upper ends as at 50 and 51, passes through the apertures in the anchorage plates 47 and 48, and is held therebetween by nuts 52 and 53 threaded thereon. The wire is placed under sufficient tension so as to maintain it under slight tension at all times, notwithstanding the temperature changes encountered in operation. Thus, sufficient tension is placed upon the wire, so that upon expansion due to increase in the temperature, it will still remain taut. A multi-spoked centering member 54 is also supported on the wire 49 by nuts 55 and 56, which together act accurately to center the wire in relation to the lower inner diameter of the tapered tube, and also to act as a bottom stop for the float; the center member 54 comprising a centrally apertured hub portion and three or more comparatively thin radial spokes extending laterally therefrom and fitting within the lower inner diameter of the tube with a sufficiently small clearance so as accurately to center the wire.

The float designated generally by the figure 57 and formed of a material having a specific gravity substantially greater than that of the liquid to be handled is provided with a center vertical aperture 58 extending therethrough, of a diameter just sufficiently greater than the diameter of the wire 49 as to afford such working clearance as will permit the free travel of the float in relation to the wire.

The vertical dimension or thickness of the "head" 59 of the float 57 is reduced to a small fraction of the thickness of the "head" of heretofore conventional types of floats. Thus, for instance, whereas the thickness of the "head" of the float of the conventional types of construction was of the order of ⅓ of the diameter of the "head" of the float, the thickness of the "head" 59 of the float 57 is of the order of 1/25 of the "head" diameter. This reduction of the thickness of the "head" to less than 1/20 of the "head" diameter illustrated in each of Figures 8 to 11 inclusive reduces the viscosity effect to about ½ of the former. By bevelling the periphery of the "head" 59 to a knife edge as in Figures 1, 2, 4, 5, 8, 9 and 11, a further reduction of viscosity coefficient is obtained; this reduction being of an order of approximately an additional 15%. In this form of construction, the knife edge 60 has a vertical thickness of the order of 0.01" to 0.005".

By reducing the diameter of the "body" portion 61 of the float, to the order of about ½ of the "head" diameter or less, as illustrated in Figures 9 and 11, the viscosity coefficient is further reduced in the order of approximately 10%. As the resulting reduction in the weight of the float tends to decrease the capacity of the rotameter, I may either lengthen the "body" beneath the "head," or I may add an additional "body" portion 62 above the float as indicated in Figure 11.

In order to further reduce the viscosity coefficient (due to the viscous "drag" of the liquid on the float), I have provided a further modified form of construction illustrated in Figures 4 and 5 in which the float designated generally by the numeral 63 is formed of a thin "head" 64 having the thickness-to-diameter relationship of the "heads" 59 in Figures 1, 2, 8, 9, 10 and 11, and having the knife edge 61, but whose weight-giving "body" 65 is spaced substantially below or above the "head" portion 64 by means of a thin connecting tubular spacer member 66; the "head" 64 alone being disposed in the tapered tube 20, while the weight-giving "body" portion 65 is disposed within an auxiliary tube 67 outside the path of liquid flow, which may be glass or metal and held between the modified upper fitting 68 and the auxiliary fitting 69. While in Figures 4 and 5, the auxiliary tube 67 and the float "body" 65 are shown as being above, this can be reversed by merely turning the entire unit upside down (from the position shown in Figures 4 and 5), and mounting the thin end of the tapered tube 20 in the modified fitting 68 while the larger-diametered end of the tube 20 will be in the fitting 21.

In this modified form of construction, the fittings 68 and 69 are held together through posts 70 and flanges 71 and 72 and nuts 73, in a manner similar to the retention of the fittings 21 and 22 shown in Figures 1, 2 and 3. The tube 67 is similarly held in sealed relation by stuffing glands 74. In place of the inwardly extending flange 46, however, a similar flange 75 is provided in the upper fitting 69 which holds the anchorage plate 48 in the same manner. The upper spacer and stop member 76 may also be provided on the wire 49. By this construction, the viscosity coefficient is reduced to a minimum and practically the full area of the tapered metering tube is available for fluid passage. The "drag" on the connecting spacer tube 66 is very small because the velocity of the liquid is reduced around the spacer tube 66 because of the increased area provided for the passage of the liquid. The weight-giving "body" 65 being in a stagnant body of liquid either above the outlet as shown in Figures 4 and 5, or below the outlet (by a reversal of positions), it is not subject to frictional "drag."

On larger size floats, it is not necessary to reduce the "head" thickness as much as on the smaller floats illustrated. Thus, for instance, on a float having a "head" diameter of approximately 3″, a sufficient reduction of viscosity effect is obtained by reducing the "head" height or "head" thickness from the previous ⅞ of an inch to ⅛ of an inch. In general, I contemplate the "head" height or "head" thickness not greater than 5 to 10% of the "head" diameter.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

As used in the following claims, the expression "rotameter" signifies a device for measuring the rate-of-flow of fluids having a tapered or frusto-conical tube in which is disposed a rotatable float providing a slight annular clearance between the widest portion of the float and the inner wall of the tapered tube. The position of the float is determined by the rate of flow of the fluid being metered; as the rate of flow increases, the float is moved to the wider portion of the tapered tube thereby providing a greater annular clearance between the float and the tube. The pressure-drop across the float is substantially constant at all rates-of-flow of the fluid and is equal to the difference in weight between the weight of the float and the weight of the fluid displaced by the float.

Having thus described the invention, what is hereby claimed as new and desired to be secured by Letters Patent is:

1. A rotameter including a tapered metering tube, a co-axial elongated chamber spaced therefrom outside the path of liquid flow and in communication with said metering tube, a metering float comprising a relatively thin "head" portion disposed within said metering tube and a weight-giving "body" portion disposed wholly within said elongated chamber and a relatively thin spacer portion interconnecting said "head" and "body" portions whereby most of the mass of said float is at all times outside the path of liquid flow; the thickness of said "head" portion being not greater than 10% of the diameter thereof, and means for guiding said metering float co-axially in relation to said tapered tube.

2. A rotameter including a tapered metering tube, a co-axial elongated chamber spaced therefrom outside the path of liquid flow and in communication with said metering tube, a metering float comprising a relatively thin "head" portion disposed within said metering tube and a weight-giving "body" portion disposed wholly within said elongated chamber and a relatively thin spacer portion interconnecting said "head" and "body" portions whereby most of the mass of said float is at all times outside the path of liquid flow; the thickness of said "head" portion being not greater than 10% of the diameter thereof and having its peripheral edge thinned generally to a knife edge, and means for guiding said metering float co-axially in relation to said tapered tube.

2. A rotameter for use in measuring rate-of-flow of liquids including a tapered transparent metering tube, a co-axial elongated chamber spaced therefrom outside the path of liquid flow and in communication with said metering tube, and a rotatable metering float comprising a relatively thin "head" portion disposed within said metering tube and a weight-giving "body" portion disposed wholly within said elongated chamber and a relatively thin spacer portion interconnecting said "head" and "body" portions whereby most of the mass of said float is at all times outside the path of liquid flow; the thickness of said "head" portion being not greater than 10% of the diameter thereof.

4. A rotameter for use in measuring rate-of-flow of liquids including a tapered transparent metering tube, a co-axial elongated chamber spaced therefrom outside the path of liquid flow and in communication with said metering tube, and a rotatable metering float comprising a relatively thin "head" portion disposed within said metering tube and a weight-giving "body" portion disposed wholly within said elongated chamber and a relatively thin spacer portion interconnecting said "head" and "body" portions whereby most of the mass of said float is at all times outside the path of liquid flow; the thickness of said "head" portion being not greater than 10% of the diameter thereof and having its peripheral edge thinned generally to a knife edge.

5. A rotameter for measuring rate-of-flow of liquids and more or less independent of liquid-viscosity fluctuations comprising a tapered tube, a thin taut guide-wire disposed along the axis of the tube, and a metering float slidably mounted on said wire; said float being provided with a thin disc-like portion disposed within said tapered tube and having a diameter generally the same as the smallest diameter of said tapered tube and having a thickness-to-diameter ratio of not more than 1/20, said disc-like portion having its peripheral edge bevelled generally to a knife-edge, said float being provided with a generally cylindrical weight-giving body portion having a small aperture extending axially therethrough, through which said guide-wire extends with a slight annular clearance, said body portion having a diameter not more than ½ the diameter of said disc-like portion but considerably more than the diameter of said guide-wire.

6. A rotameter for measuring rate-of-flow of liquids and more or less independent of liquid-viscosity fluctuations comprising a tapered tube, a thin taut guide-wire disposed along the axis of the tube, and a metering float slidably mounted on said wire; said float being provided with a thin disc-like portion disposed within said tapered tube and having a diameter generally the same as the smallest diameter of said tapered tube and having a thickness-to-diameter ratio of not more than 1/20, said float being provided with a generally elongated weight-giving body portion having a small aperture extending therethrough, through which said guide-wire extends with a slight annular clearance, said body portion having a transverse dimension not more than 1/2 the diameter of said disc-like portion but considerably more than the diameter of said guide-wire.

KERMIT K. FISCHER.